Dec. 24, 1929.   J. W. COX   1,740,767
CONDUIT FITTING
Filed March 27, 1925
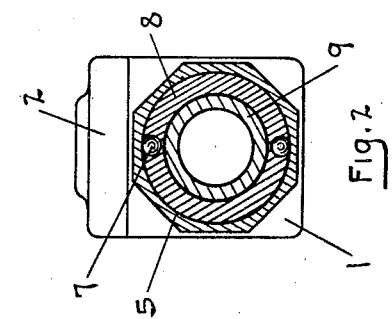
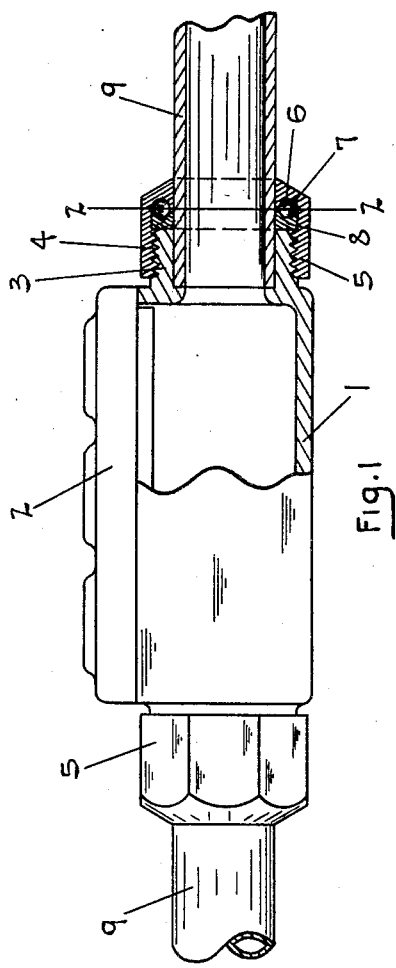
Inventor
John W. Cox
By
Attorney Patented Dec. 24, 1929

1,740,767

UNITED STATES PATENT OFFICE

JOHN WILLIAM COX, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed March 27, 1925. Serial No. 18,804.

This invention is designed to improve conduit fittings particularly such fittings as are designed to be used with threadless conduits. With such conduits it is desirable to clamp them in place in the fitting and also to seal them. The present invention is designed to accomplish these purposes. Features and details of the invention will appear from the specification and claims.

The invention is illustrated in the accompanying drawings as follows:—

Fig. 1 shows a side elevation, partly in section.

Fig. 2 a section on the line 2—2 in Fig. 1.

1 marks the body of the fitting, this being exemplified in the present drawing in the form of a conduit box, 2 marks the cover for the box, and 3 a conduit receiving extension. This conduit receiving extension is preferably externally screw-threaded, at 4.

A cap nut 5 is screwed on the extension 3. It has a ball race 6 on the underside of the end of the cap in which are arranged the steel balls 7.

A metal sealing ring 8 is arranged in the cap over the balls and the cap with this ring and the balls in place is placed over the conduit 9 and the conduit inserted in the extension and the cap screwed to place. The effect of this action, as the nut is advanced, is to spin or swage the ring through the action of the balls rolling on the ring in the last turn or two of the cap so as to thoroughly seal the joint between the extension and the conduit and at the same time so tightly engage the conduit as to secure it in place in the fitting.

What I claim as new is:—

1. In a conduit fitting, the combination of a conduit body having a conduit-receiving extension; a cap mounted on the extension, said cap being rotatable on the extension and axially movable as rotated; a soft metal ring between the cap and extension; and means actuated by the cap as it is rotated and moved axially spinning the ring into sealing and clamping engagement with an inserted conduit.

2. In a conduit fitting, the combination of a conduit body having a conduit-receiving extension; a cap mounted on the extension, said cap being rotatable on the extension and axially movable as rotated; a soft metal ring between the cap and extension; and balls actuated by the cap as it is rotated and moved axially on the extension spinning the ring into sealing and clamping engagement with an inserted conduit.

3. In a conduit fitting, the combination of a conduit body having a conduit-receiving extension; a cap screwed on the extension; a soft metal packing ring between the cap and extension; and means actuated by the cap spinning the ring into sealing and clamping engagement with an inserted conduit as the cap is screwed into place.

In testimony whereof I have hereunto set my hand.

JOHN WILLIAM COX.